No. 867,972. PATENTED OCT. 15, 1907.
J. HOMAN.
INCUBATOR.
APPLICATION FILED NOV. 9, 1906.

2 SHEETS—SHEET 1.

Witnesses
G. Howard Walmsley
Edward L. Reed

Inventor
James Homan,

By

Attorney

No. 867,972. PATENTED OCT. 15, 1907.
J. HOMAN.
INCUBATOR.
APPLICATION FILED NOV. 9, 1906.

2 SHEETS—SHEET 2.

Witnesses
G. Howard Walmsley.
Edward L. Reed.

Inventor
James Homan.

By _____
Attorney

UNITED STATES PATENT OFFICE.

JAMES HOMAN, OF SPRINGFIELD, OHIO.

INCUBATOR.

No. 867,972.     Specification of Letters Patent.     Patented Oct. 15, 1907.

Application filed November 9, 1906. Serial No. 342,667.

*To all whom it may concern:*

Be it known that I, JAMES HOMAN, a citizen of the United States, residing at Springfield, in the county of Clark and State of Ohio, have invented certain new and useful Improvements in Incubators, of which the following is a specification, reference being had therein to the accompanying drawings.

The present invention relates to incubators, and has for its object the production of an incubator in which it will be possible to obtain a practically absolute uniformity of temperature in every part of the egg chamber and maintain this temperature without variation with a minimum consumption of fuel, thereby rendering it possible to successfully incubate any number of eggs which may be put in the incubator at any time regardless of the state of incubation of the eggs already in the incubator.

A further object is to provide a device which will be very simple in operation and the heat controlling devices of which will be automatic, requiring little or no attention on the part of the operator, the regulating device being adjusted so that it is possible to overheat or cool the egg chamber only under extreme conditions, and so as to render the use of a thermometer and the constant watchfulness, which the use of a thermometer necessitates, unnecessary.

With these ends in view my invention consists in certain novel features of construction to be hereinafter described, and then more particularly pointed out in the claims.

Figure 1:
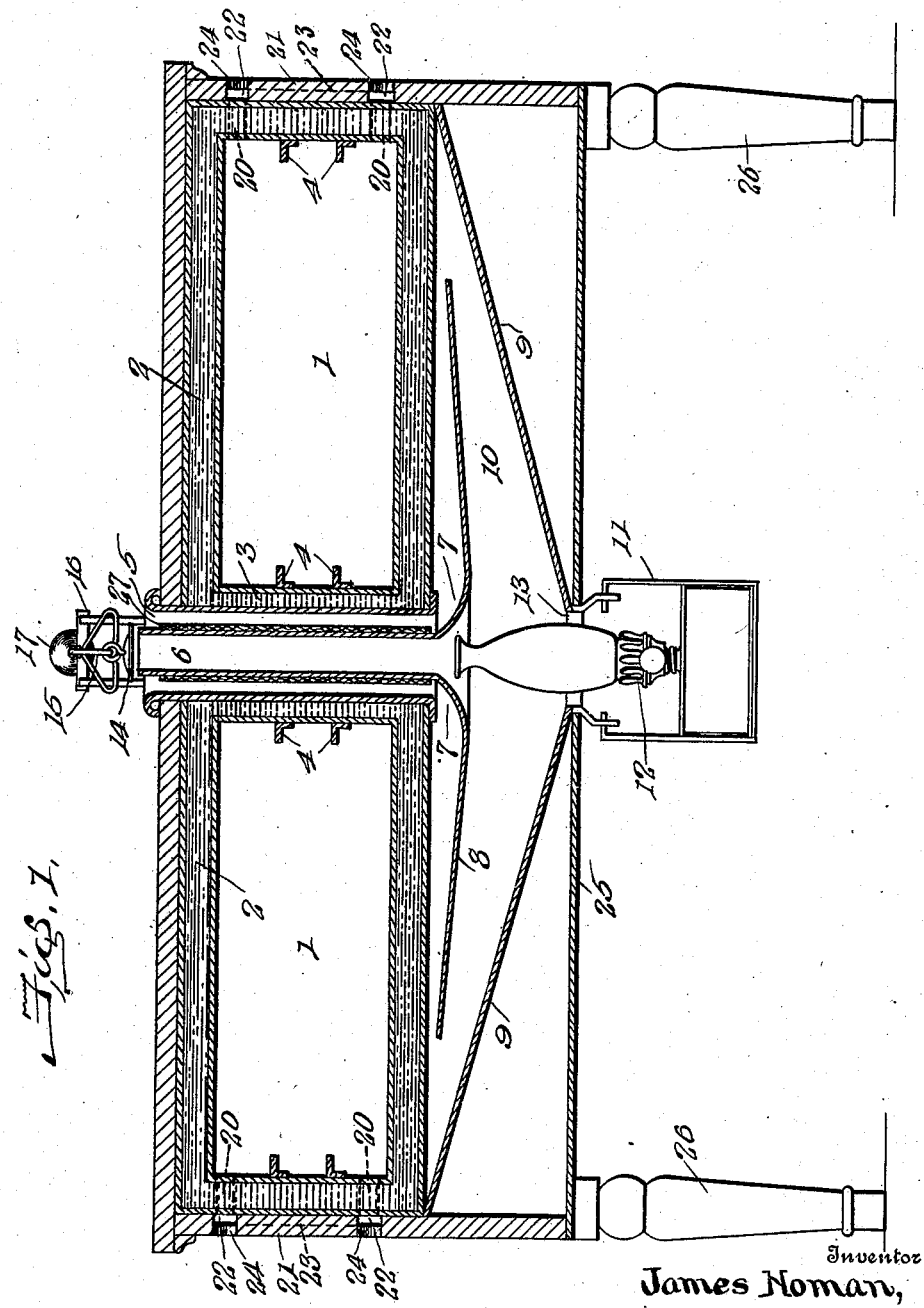
Figure 2:
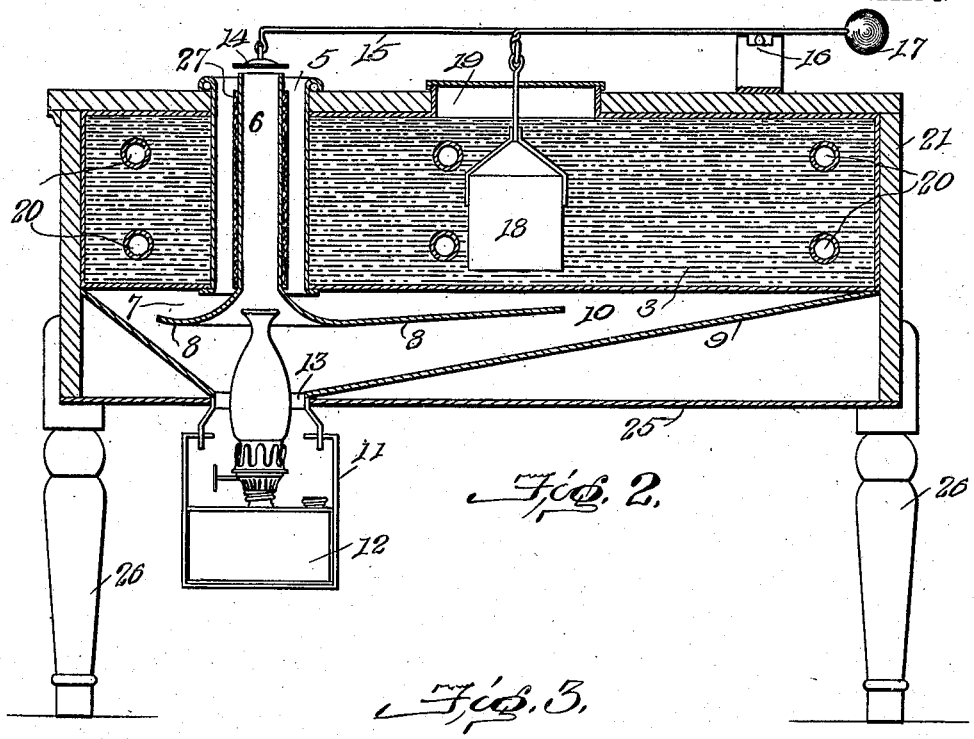
Figure 3:
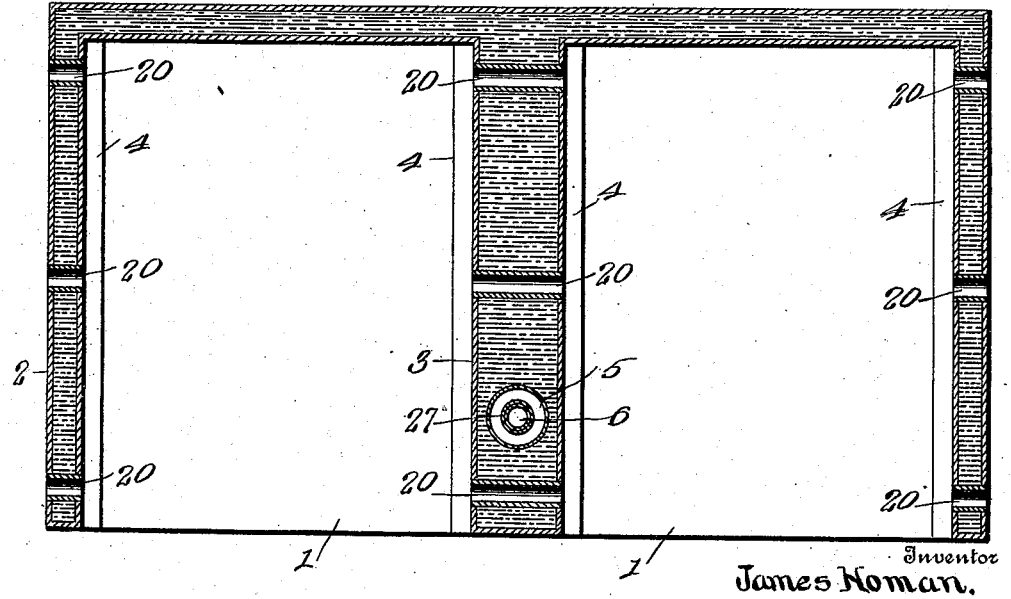

In the accompanying drawings, Figure 1 is a longitudinal sectional view of my invention; Fig. 2 is a transverse sectional view of the same; and Fig. 3 is a horizontal sectional view of the egg chamber and the surrounding water tanks.

In these drawings, I have illustrated one embodiment of my invention in which the egg chambers are indicated by the reference numeral 1. These chambers are surrounded on the top and bottom and on three sides thereof by a doubled walled casing, forming a water chamber 2. In the larger size incubators, such as are shown in the drawings, I provide a central partition 3, corresponding in construction to the side walls and extending centrally through the egg chamber to the front thereof and dividing the same into two chambers which are provided on their opposite sides with brackets or ledges 4 to support the egg trays. Near the forward end of this partition a flue or air passage 5 extends upwardly through the same from top to bottom of the water chamber, forming an air passage through the water chamber comprised in the partition.

Within the heat flue 5 is a second flue 6, arranged centrally thereof and having its lower end flared, as shown at 7, and extending outwardly to form a flange 8 of varying width and extending a considerable distance along the bottom of the water chamber surrounding the egg chamber.

Secured to the edges of the water chamber and extending downwardly to a common point directly beneath the heat flue 5 is a wall 9 forming the bottom of the heat chamber 10 which is formed between the bottom of the water chamber and said wall 9. In the present instance, this bottom wall takes the form of an irregular pyramid having its apex located near the front of the incubator, and, as stated, beneath the heat flues.

Supported in a suitable frame 11, carried by the bottom wall 9, is a suitable lamp 12, or other source of heat supply. The chimney of the lamp extends through the opening 13 at the apex of the bottom wall 9 and into the flared lower portion of the central heat flue 6. The passage of the heat through this flue is controlled by a damper 14 in the form of a cap adapted to close the upper end of the flue when in its lower position. This damper or cap is carried by a rod 15, pivotally supported above the frame of the incubator at 16 and provided with a counterweight 17.

Secured to the rod 15 at a point intermediate its pivotal connection and the damper is a thermostatic float 18 which extends through an opening 19 in the water chamber of the partition 3 and is submerged in the water therein. This float is of such a construction that it rises and falls as the temperature of the water within the chamber varies, thereby raising and lowering the damper 14 and regulating the amount of heat passing through the flue 6. This thermostatic float may be of any suitable construction, but I prefer and have shown in the accompanying drawings a float adapted to contain an expansible fluid which expands and contracts under the varying temperature of the water, and, by varying the displacement of the water within the chamber, alters its position therein, thereby controlling the position of the damper, such a thermostatic float forming the basis of a separate application filed by me of even date herewith.

The end walls of the water chambers surrounding the egg chambers and the partition 3 are provided with a series of air passages 20 adapted to allow a free circulation of air through the egg chambers from the outer atmosphere, thereby maintaining the temperature of the air within the chambers at a proper humidity. These air passages may be arranged in any suitable manner, but I prefer to arrange them as shown in the drawings, in which I have provided both the ends and the central partition with six passages arranged in rows of three each near the top and bottom of the chamber.

In order to bring the air to a temperature corresponding to that of the egg chambers before it is admitted to the same I provide in the ends of the wooden casing 21, which surrounds the device as a whole, longitudinal air passages or slots 22, extending along each series of openings through the water chambers, the upper and lower passages 22 being connected by a vertical passage 23. The longitudinal passages 22 are provided with openings 24 connecting the same with the outer air and preferably located intermediate the passages 20 through the water chamber, thereby causing the air which enters through the openings 24 to pass over a portion of the heated surface of the wall of the water chamber before it enters the egg chamber, thus bringing the temperature of the same up to correspond with that of the egg chamber. The wooden casing 21 which surrounds the water chambers extends beneath the same to the level of the lowest point of the bottom wall 9 and preferably has its lower side closed by a sheet metal wall 25 and is provided with suitable supporting standards 26.

The operation of the device is simple and will be readily understood from the foregoing description. In brief, it is as follows: A thermostatic float 18 is adjusted to maintain the damper 14 in a fixed relation to the flue 6 at a given temperature of the water in the chamber 3. When the temperature of the water is raised above a given point, the float 18 rises therein, thereby raising the damper 14 and allowing the heat from the lamp 12 to pass directly through the flue 6 and escape to the open air without giving off any heat to the water chamber. The flue 6 may, if desired, be provided with a cover 27, of asbestos or other suitable material, to further prevent the radiation of heat. As the temperature of the water falls the float 18 contracts and sinks to a lower level in the water, thereby closing the damper 14 of the flue 6 and preventing the escape of the heat from the upper end thereof and causing the same to pass out at the lower end of the flue around the edges of the flange 8 and out through the heat flue 5, thereby bringing the heat into contact with a large portion of the lower surface of the water chamber, forming the lower wall of the egg chambers. As the temperature of the water again rises the float 18 expands and the operation is repeated. In practice, the float 18 will assume a position in the water which will hold the damper 14 in such relation to the flue 6 as to cause a sufficient amount of the heat to pass out at the lower end of the flue 6 around the flange 8 and into contact with the water chamber to maintain the water therein at the desired temperature, whereupon there will be very little movement of the float or damper.

I wish it to be understood that I do not desire to be limited to the exact details of construction shown and described, for obvious modifications will occur to a person skilled in the art.

Having thus fully described my invention, what I claim as new and desire to secure by Letters Patent, is:—

1. An incubator comprising a casing having an egg chamber within the same and having a water chamber inclosing the top, bottom, end and rear walls of said egg chamber, a partition extending from the rear wall to the front of said casing and having a water chamber formed therein and in open communication with the water chamber inclosing the top, bottom and rear walls of said egg chamber, and means for heating the water in said water chamber, substantially as described.
2. An incubator comprising a casing containing an egg chamber and having a water chamber surrounding the top and bottom walls and a plurality of the side walls of said egg chamber, a partition dividing said egg chamber into compartments and having a water chamber formed therein and in open communication with the water chamber of said walls and having air passages extending through the same to connect said compartments, and means for heating the water in said chambers, substantially as described.

3. In an incubator, the combination, with a casing containing an egg chamber and having a water chamber surrounding a plurality of the walls of said egg chamber, of means for applying heat to said water chamber, and means controlled by the temperature of the water in said chamber for regulating the amount of heat applied thereto, substantially as described.

4. In an incubator, the combination, with a casing containing an egg chamber and having a water chamber surrounding a plurality of the sides of said egg chamber, of a source of heat supply, a plurality of passages for said heat, one of said passages being arranged to bring the heat in contact with said water chamber and means regulated by the temperature of the water of said chamber for controlling said heat passages, substantially as described.

5. In an incubator, the combination, with a casing containing an egg chamber and having a water chamber extending on a plurality of sides of said egg chamber, of a source of heat supply, a direct passage for said heat and a circuitous passage therefor, and means controlled by the temperature of the water in said chamber for regulating the circulation of the heat through said passages, substantially as described.

6. In an incubator, the combination, with a casing containing an egg chamber and having a water chamber extending on a plurality of the sides of said egg chamber, and a source of heat supply located beneath said water chamber, of two heat flues extending through said water chamber above said source of heat supply, one of said heat flues allowing the heat to escape directly to the air and the other causing the heat to come into contact with the wall of said water chamber, and means controlled by the temperature of the water in said chamber for regulating the circulation of heat in said passages, substantially as described.

7. In an incubator, the combination, with a casing containing an egg chamber and having a water chamber extending on a plurality of the sides of said egg chamber, a heat flue extending through said water chamber, a second heat flue mounted within the first-mentioned flue and having a flange at the lower end thereof extending beneath the bottom of said water chamber, a source of heat supply located beneath said flues, and means controlled by the temperature of the water in said chamber for causing the heat to pass through either one of said flues, substantially as described.

8. In an incubator, the combination, with a casing containing an egg chamber and having a water chamber surrounding a plurality of the sides of said egg chamber, of a heat flue extending through said water chamber, a second flue mounted within said first-mentioned flue and arranged centrally thereof and having its lower end flared, a flange carried by the flared end of said central heat flue and extending beneath the walls of said water chamber, a lamp located beneath said heat flues and having the chimney thereof extending into the flared portion of said central flue, and means controlled by the temperature of the water in said water chamber for causing the heat to pass through either of said flues, substantially as described.

9. In an incubator, the combination, with a casing containing an egg chamber and having a water chamber extending on a plurality of the sides of said egg chamber, and a heat chamber beneath said water chamber, of a heat flue extending through said water chamber, a second heat flue mounted within said first-mentioned flue and arranged centrally thereof, a flange carried by said central flue and extending into said heat chamber to separate said flues, a source of heat supply located beneath said flues, and means controlled by the temperature of the water within said chamber for regulating the passage of heat through said flues, substantially as described.

10. In an incubator, the combination, with a casing containing an egg chamber and having a water chamber extending on a plurality of the sides of said egg chamber, of downwardly converging walls forming a heat chamber beneath the same, a heat flue extending through said water chamber and connecting said heat chamber with the atmosphere, a second heat flue mounted within said first-mentioned flue and arranged centrally thereof, a flange carried by said central flue and extending into said heat chamber to separate said flues, and means controlled by the temperature of the water in said chamber for regulating the passage of heat through said flues, substantially as described.

11. In an incubator, the combination, with a casing containing an egg chamber and having a water chamber extending on a plurality of the sides of said egg chamber, said water chamber having air passages therethrough, of an outer casing surrounding said water chamber and having air passages through the same out of alinement with the air passages through said water chamber and having passages formed between the same and said water chamber for connecting said air passages, and means for heating the water in said water chamber, substantially as described.

12. In an incubator, the combination, with a casing containing an egg chamber and having a water chamber surrounding a plurality of the sides of said egg chamber, said water chamber having air passages therethrough, of an outer casing inclosing the end walls of said water chamber and having air passages therethrough, said passages being out of alinement with the air passages of said water chamber, a portion of the wall of said water chamber being separated from said outer casing to form an air chamber communicating with the passages in said water chamber and in said outer casing, and means for heating the water in said water chamber, substantially as described.

In testimony whereof, I affix my signature in presence of two witnesses.

JAMES HOMAN.

Witnesses:
E. O. HAGAN,
EDWARD L. REED.